C. D. HELM.
SAW GUMMER.
APPLICATION FILED SEPT. 24, 1918.
1,313,238. Patented Aug. 12, 1919.
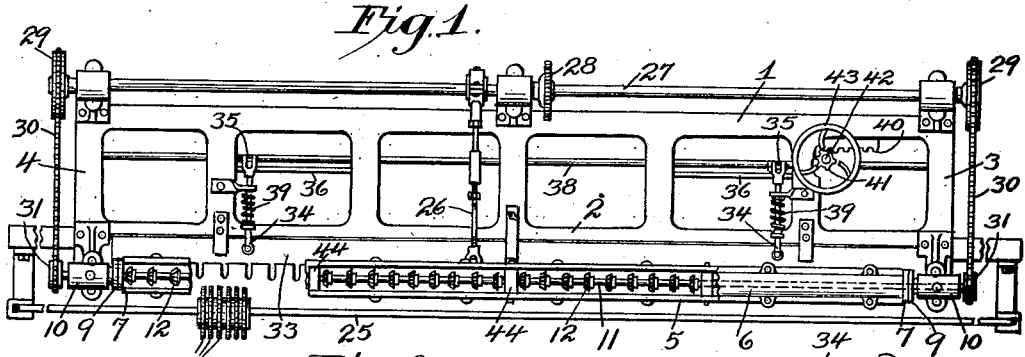
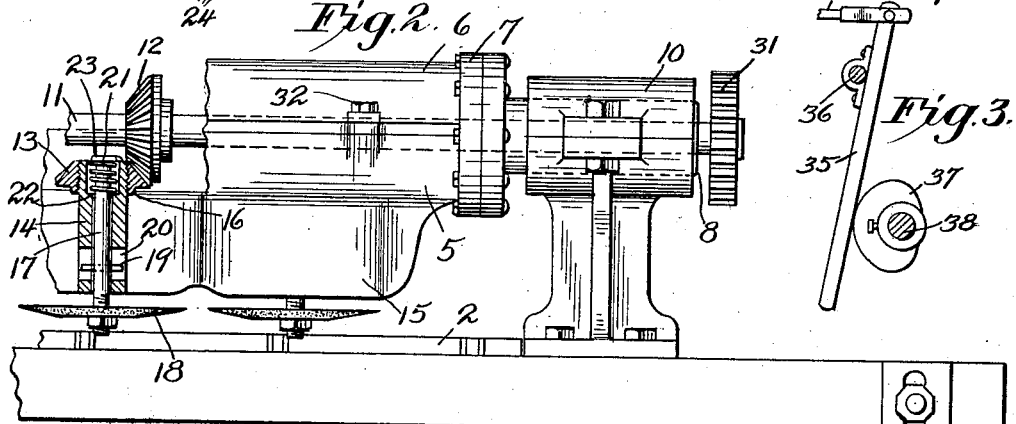
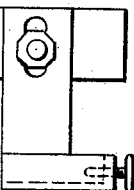
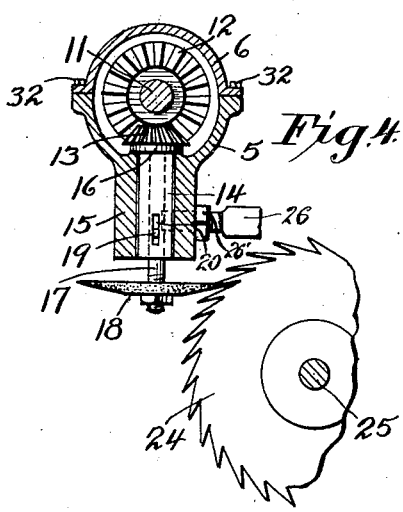
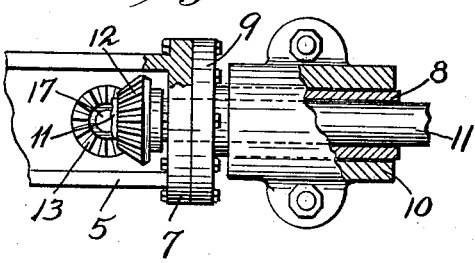
Inventor
CLYDE D. HELM
By A. L. Jackson
Attorney
Witness

UNITED STATES PATENT OFFICE.

CLYDE D. HELM, OF FORT WORTH, TEXAS, ASSIGNOR TO OIL MILL MACHINERY & MANUFACTURING CO., OF FORT WORTH, TEXAS, A CORPORATION OF TEXAS.

SAW-GUMMER.

1,313,238.   Specification of Letters Patent.   Patented Aug. 12, 1919.

Application filed September 24, 1918. Serial No. 255,441.

*To all whom it may concern:*

Be it known that I, CLYDE D. HELM, a citizen of the United States of America, residing at Fort Worth, in the county of Tarrant and State of Texas, have invented certain new and useful Improvements in Saw-Gummers, of which the following is a specification.

My invention relates to saw gummers or sharpeners and more particularly to gin or metal saw gummers, and the object is to provide a saw gumming machine which is greatly simplified in operation and which will gum or sharpen gin or metal saws in a very short time and by which much time and labor will be saved and loss of material prevented, and to provide a saw gummer in which the gumming or sharpening attachments are automatically adjustable to the saw. In the operation of gins for delinting cotton seed the saws are blunted or become dull so quickly that frequent gumming and sharpening is necessary. An hour's time plainly shows the deterioration of the saw in removing the lint from the seed. The object of this invention is to provide devices by which the saws of the gin can be cleaned and sharpened in a very short time and to provide devices which will have to be shifted only two or three times to clean and sharpen the whole gang of saws. Another object is to improve the method of operation so that there will be uniformity and greater speed in gumming and sharpening a gang of saws. Other objects and advantages will be fully explained in the following description, and the invention will be more particularly pointed out in the appended claims.

Reference is had to the accompanying drawings which form a part of this application.

Figure 1 is a plan view of the improved saw gummers, certain parts being broken away for clearness of illustration.

Fig. 2 is a side elevation of a part of the machine partly in section.

Fig. 3 is a detail view of the brace shifting mechanism.

Fig. 4 is a vertical cross-section of the protecting hood and the gear shaft on an enlarged scale.

Fig. 5 is an enlarged detail view showing a plan view of the gear for operating the saw gummer and also showing, in section, the means for mounting the protecting hood.

Similar characters of reference are used to indicate similar parts throughout the several views.

The invention is shown mounted on an ordinary gummer or saw sharpener frame, shown in several patents and not necessary to be shown herein. The frame for the improved gummer includes a horizontal rectangular structure having longitudinal members 1 and 2 and end members 3 and 4. A gummer casing is composed of a swinging bearing member 5, and a hood 6 is provided and attached thereto by suitable bolts 32. The bearing member 5 has end cylindrical flanges 7 integral therewith. The gummer casing is swingingly mounted by means of sleeves 8 which have cylindrical flanges 9 bolted rigidly to the flanges 7. The sleeves 8 are journaled in bearings 10 which are attached to the gummer frame at the juncture of members 2 and 3 and members 2 and 4. The gummer casing may thus have a rocking motion in the bearings 10. A driving shaft 11 is journaled in the sleeves 8 for operating all the gummer gearing. Additional bearing members 44 for the shafts 11 are positioned within the gummer casing. Bevel gear wheels 12, preferably thirty-six, are rigid to shaft 11 and mesh with and drive bevel gear wheels 13 which are screwed on vertical sleeves 14. The sleeves 14 are journaled in bearings 15 which consist in depending portions of the hood casing 5. The hubs or projecting sleeves 16 of the gear wheels 13 rest on the upper ends of the bearings 15 and rotate thereon. The floating shafts 17 are provided for the gummers 18. The shafts 17 are made to rotate with the sleeves 14 by keys 19 which project through the shafts 17 and loosely through slots 20 in the sleeves 14. The shafts 17 are supported by spiral springs 21 which rest on interior shoulders 22 in the sleeves 14 and by heads 23 on the shafts 17, the springs bearing against shoulders 22 and against heads 23. The shafts 17 are thus made floating shafts, being vertically yielding. The gummers 18 are adapted to engage the saws 24 which are rigid with the shaft 25. The shaft 25 is mounted on the frame of the gumming machine.

The gummers 18 are swung in and out of engagement with the saw teeth automatically by means of an adjustable rod 26 which is connected to the part 15 of the gummer casing and actuated by suitable driving means through shaft 27. The end of rod 26 is screwed into part 15 and braced by a lock-nut 26'. The shaft 27 is driven by any suitable power through sprocket wheel 28. This shaft drives sprocket wheels 29 which drive sprocket chains 30. The chains 30 drive sprocket wheels 31 which are rigid with shaft 11 for driving this shaft which drives all the gummers simultaneously, as above mentioned.

A brace 33 is provided for the saws 24 to prevent axial movement of the saws while the saws are being gummed or sharpened. This brace has a horizontal sliding motion. Rods 34 are connected to the frame or brace 33 and at the other end pivotally connected to actuating bars 35 which are pivotally mounted on shafts or pivot bolts 36. The bars 35 are actuated by cams 37 on the rotating shaft 38 and the rotation of this shaft must be timed to withdraw the brace 33 when the gang of saws is to be axially shifted. Spiral springs 39 on the rods 34 hold the brace 33 in position while the brace is in operation.

The frame which carries the gumming mechanism is shifted by rack 40 which is attached thereto and by a pinion 41 on the shaft 42 which is provided with a hand wheel 43. As stated above only two or three shifts of the saws will be necessary as the gummers are sufficient in number to gum all the saws before and between the shifts.

Various changes in the construction, proportion and arrangement of the several parts may be made without departing from the appended claims.

What I claim is:—

1. A saw gummer and sharpener comprising a frame, bearings mounted on said frame, a gummer casing provided with sleeves swingingly mounted in said bearings, a driving shaft journaled in said sleeves, a plurality of gummers provided with vertically disposed floating shafts journaled in said casing, gearing operatively connecting said floating shafts with said driving shaft, means for rocking said casing to throw said gummers in and out of engagement with saws to be gummed or sharpened, and means for shifting said frame.

2. A saw gummer and sharpener comprising a frame, bearings mounted on said frame, a gummer casing having sleeves journaled in said bearings, a driving shaft journaled in said sleeves, gummers provided with floating shafts journaled in said casing, gearing operatively connecting said floating shafts with said driving shaft, means for rocking said casing to throw said gummers in and out of engagement with saws to be gummed, and means for shifting said frame.

3. A saw gummer and sharpener comprising a frame, bearings mounted on said frame, a gummer casing having cylindrical flanges on the ends thereof, sleeves having cylindrical flanges bolted to the last named flanges and journaled in said bearings, a driving shaft journaled in said sleeves, gummers provided with floating shafts journaled in said casing, gearing operatively connecting said floating shafts with said driving shaft, means for rocking said casing to throw said gummers in and out of engagement with saws to be gummed, a saw brace and means moving the saw brace in and out of engagement with said saws, and means for shifting said frame when said brace is out of engagement with the saws.

4. A saw gumming and sharpening machine having a swinging casing, a driving shaft journaled in said casing, a plurality of gummers provided with floating shafts journaled in said casing, gearing operatively connecting said floating shafts with said driving shaft, and means for swinging said gummers in and out of engagement with the saws to be gummed and sharpened.

5. A saw gumming and sharpening machine having a swinging casing, a driving shaft journaled in said casing, a plurality of beveled gear wheels on said shaft, vertical sleeves journaled in said casing and beveled pinions on said sleeves meshing with said gear wheels, floating shafts provided with gummers and journaled in said sleeves and loosely connected therewith and driven thereby and means for swinging said gummers or sharpeners in and out of engagement with the saws to be gummed and sharpened.

6. A saw gumming and sharpening machine having a swinging casing, a driving shaft journaled in said casing, a plurality of beveled gear wheels rigid with said shaft, vertical sleeves journaled in said casing and beveled pinions on said sleeves meshing with said gear wheels, floating shafts journaled in said sleeves and carrying saw gumming and sharpening devices, keys rigid with said floating shaft and engaging said vertical sleeves loosely whereby said sleeves drive said floating shafts and means for swinging said casing to throw said gumming and sharpening devices out of mesh and in mesh with the saws to be gummed and sharpened.

In testimony whereof, I set my hand, this 10th day of September, 1918.

CLYDE D. HELM.

Copies of this patent may be obtained for five cents each, by addressing the "Commissioner of Patents, Washington, D. C."